(12) United States Patent
Braillon-Girard et al.

(10) Patent No.: US 12,480,018 B2
(45) Date of Patent: Nov. 25, 2025

(54) UNSATURATED RESINS AND COATING COMPOSITIONS THEREFROM

(71) Applicant: SWIMC LLC, Cleveland, OH (US)

(72) Inventors: Marie Braillon-Girard, Tournus (FR); Sébastien Gibanel, Tournus (FR); Dominique Michel, Tournus (FR); Edith Barre, Tournus (FR); Matthieu Andriot, Tournus (FR)

(73) Assignee: SWIMC LLC, Cleveland, OH (US)

( * ) Notice: Subject to any disclaimer, the term of this patent is extended or adjusted under 35 U.S.C. 154(b) by 167 days.

(21) Appl. No.: 18/000,975

(22) PCT Filed: Jun. 11, 2021

(86) PCT No.: PCT/US2021/036918
§ 371 (c)(1),
(2) Date: Dec. 7, 2022

(87) PCT Pub. No.: WO2021/252832
PCT Pub. Date: Dec. 16, 2021

(65) Prior Publication Data
US 2023/0212418 A1 Jul. 6, 2023

Related U.S. Application Data

(60) Provisional application No. 63/038,339, filed on Jun. 12, 2020.

(51) Int. Cl.
| | | |
|---|---|---|
| C09D 167/06 | (2006.01) | |
| C09D 7/63 | (2018.01) | |
| C09D 7/65 | (2018.01) | |
| C09D 191/06 | (2006.01) | |

(52) U.S. Cl.
CPC ............. *C09D 167/06* (2013.01); *C09D 7/63* (2018.01); *C09D 7/65* (2018.01); *C09D 191/06* (2013.01)

(58) Field of Classification Search
CPC .......... C09D 167/06; C09D 7/65; C09D 7/63; C09D 191/06
See application file for complete search history.

(56) References Cited

U.S. PATENT DOCUMENTS

| | | |
|---|---|---|
| 8,840,966 B2 | 9/2014 | Cavallin et al. |
| 9,011,999 B2 | 4/2015 | Cavallin et al. |
| 9,187,673 B2 * | 11/2015 | Hayes ............... C09D 175/06 |
| 9,206,332 B2 | 12/2015 | Cavallin et al. |
| 9,321,935 B2 | 4/2016 | Seneker et al. |
| 9,487,672 B2 | 11/2016 | Cavallin et al. |
| 2005/0080223 A1 | 4/2005 | Tuominen et al. |
| 2011/0244156 A1 | 10/2011 | Lock et al. |
| 2011/0244157 A1 | 10/2011 | Singer et al. |
| 2012/0121841 A1 | 5/2012 | Szkudlarek et al. |
| 2013/0211001 A1 | 8/2013 | Skillman et al. |
| 2014/0076768 A1 | 3/2014 | Skillman et al. |
| 2017/0260433 A1 | 9/2017 | Hennig et al. |
| 2019/0284336 A1 | 9/2019 | Skillman et al. |
| 2020/0002524 A1 | 1/2020 | Brown et al. |

FOREIGN PATENT DOCUMENTS

| | | | | |
|---|---|---|---|---|
| EP | 3074447 A1 | 10/2016 | | |
| JP | 2002060473 A | 2/2002 | | |
| JP | 2004339493 A | 12/2004 | | |
| WO | WO-2021105970 A1 * | 6/2021 | ............... | B05D 7/14 |
| WO | WO-2021231949 A1 * | 11/2021 | ............. | B65D 23/02 |

OTHER PUBLICATIONS

International Search Report and Written Opinion issued in Application No. PCT/US2021/036918 dated Sep. 21, 2021, 8 pages.
European Search Report issued in Application No. 21822677.7 mailed May 22, 2021, 4 pages.
International Preliminary Report on Patentability with Written Opinion issued in PCT Application No. PCT/US2021/036918 dated Dec. 22, 2022, 6 pages.

* cited by examiner

*Primary Examiner* — Robert S Walters, Jr.
(74) *Attorney, Agent, or Firm* — Honigman LLP

(57) ABSTRACT

The disclosure provides a resin having unsaturated functionality effective for self-cross linking in compositions that are at least substantially free of external cross linkers and still achieve desired performance for internal and/or external food or beverage can coating applications. Unsaturation may be provided by reactants having a carbon-carbon double bond less reactive than a carbon-carbon double bond of maleic anhydride.

18 Claims, No Drawings

UNSATURATED RESINS AND COATING COMPOSITIONS THEREFROM

CROSS REFERENCE TO RELATED APPLICATIONS

The present application is a national stage application under 35 U.S.C. 371 of International Application No. PCT/US2021/036918, entitled UNSATURATED RESINS AND COATING COMPOSITIONS THEREFROM, filed on Jun. 11, 2021, which claims benefit under 35 U.S.C. § 119 (e) from U.S. Provisional Patent Application Ser. No. 63/038,339, entitled "UNSATURATED RESINS AND COATING COMPOSITIONS THEREFROM", filed Jun. 12, 2020, which are both hereby incorporated by reference in their entirety.

TECHNICAL FIELD

This disclosure relates to unsaturated resins, and coating compositions including such resins.

BACKGROUND

A wide variety of compositions have been used to coat the interior and exterior surfaces of packaging articles, such as food or beverage containers. For example, metal cans are sometimes coated with a suitable composition and hardened by curing in an oven. The coated substrate may then be formed into a can end or body. Liquid coating compositions may be applied to either interior or exterior surface of the food or beverage container by spraying, dipping, rolling, or other suitable application methods to the formed article and then cured.

Packaging coatings should preferably be capable of high-speed application to the substrate and provide the necessary properties when hardened to perform in this demanding end use. For example, the composition and coating should be safe for food contact, have good adhesion to the substrate, and resist degradation over long periods of time, even when exposed to harsh environments. Many current packaging coatings suffer from one or more performance defects, are relatively high in volatile organic compounds (VOCs), and/or contain extractable quantities of one or more undesirable compounds.

Various coatings have been used as interior or exterior protective can coatings, including epoxy-based coatings, polyvinyl-chloride-based coatings, isocyanate-based coatings, and/or formaldehyde-based coatings. Each of these coating types, however, has potential shortcomings. For example, the recycling of materials containing polyvinyl chloride or related halide-containing vinyl polymers can be problematic. There is also a desire by some to reduce or eliminate certain epoxy compounds as well as reduce or eliminate cross-links based on isocyanate and/or formaldehyde chemistry commonly used to formulate food-contact or over varnish coatings.

To address the shortcomings in various coating compositions, the packaging coatings industry has sought coatings based on alternative polymer chemistry such as polyester resin systems. It has been problematic, however, to formulate robust polyester-based coatings that exhibit the required balance of coating characteristics (such as, flexibility, adhesion, corrosion resistance, stability, resistance to crazing, and the like to suggest but a few coating characteristics) as well as needed composition characteristics to allow application using common food or beverage container coating methods. For example, there has typically been a tradeoff between corrosion resistance and fabrication properties for many coatings. Polyester-based coatings that have exhibited both good fabrication properties and an absence of crazing often tended to be too soft and exhibit unsuitable corrosion and/or abrasion resistance. Conversely, polyester-based coatings that have exhibited good corrosion and/or abrasion resistance have typically exhibited poor flexibility and unsuitable crazing when fabricated. Polyester-based coating formulations without external cross-linkers often face processing shortcomings due to undesired gelling and/or viscosity issues rendering conventional application techniques difficult.

SUMMARY

In one aspect, the present disclosure provides, a coating composition suitable for food or beverage cans. In one embodiment, the coating composition comprises an unsaturated polyester resin having an iodine value at least about 10, wherein at least some of the unsaturation of the polyester resin is provided by one or more unsaturated reactants having a carbon-carbon double bond less reactive than a carbon-carbon double bond of maleic anhydride; wherein the coating composition is substantially free of formaldehyde-based cross linkers; and wherein the coating composition includes one of (i) an ether group in the unsaturated polyester resin, (ii) a metal drier in the coating composition, or (iii) both an ether group in the unsaturated polyester resin and a metal drier in the coating composition.

In other approaches or embodiments, the coating composition of the preceding paragraph may be combined with other features, approaches, or embodiments in any combination thereof. These optional features including one or more of the following: wherein the coating composition is substantially free of formaldehyde and residues thereof whether present as a structural unit of a component of the coating compositions or free formaldehyde in the coating composition; and/or wherein the unsaturated polyester resin has a number average molecular weight of about 10,000 or less, preferably, about 4,000 or less; and/or wherein the unsaturated polyester resin has a number average molecular weight greater than about 400 or greater; and/or wherein the unsaturated polyester resin includes pendant aliphatic unsaturation; and/or wherein the unsaturated polyester resin includes the ether group; and/or wherein the ether group of the unsaturated polyester resin is provided by one or more reactants having an ether group; and/or wherein the reactant having the ether group has the structure $R_1$—$(CR_2)_n$—O—$(CR_2)_n$—$R_1$ wherein each $R_1$ is independently a reactive group capable of participating in a step-growth reaction and each $R_2$ is independently a hydrogen or an organic group, and n is independently an integer from 1 to 10; and/or wherein each $R_1$ is independently a carboxylic group, an anhydride group, an alkyl ester group, or a hydroxyl group; and/or wherein each $R_1$ is a hydroxyl group and each n independently an integer from 1 to 4; and/or wherein the ether group is provided by diethylene glycol; and/or wherein the one or more unsaturated reactants have the structure of Formula I

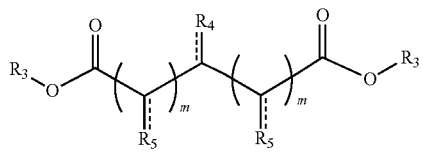

(Formula I)

wherein $R_3$ is independently hydrogen or a hydrocarbyl group; $R_4$ is a C1 group or a C2 to C10 alkene group; m is independently an integer from 0 to 4; $R_5$ is independently hydrogen or a saturated or unsaturated group; at least one of $R_4$ or $R_5$ includes a carbon-carbon double bond; and if $R_4$ is the C1 group and includes the carbon-carbon double bond, then the carbon-carbon double bond is located between a carbon in the $R_4$ group and an adjacent carbon atom to provide the unsaturation and if $R_4$ is the C2 to C10 alkene group and includes the carbon-carbon double bond, then the unsaturation is provided by a carbon-carbon double bond in the alkene group; and if $R_5$ is a C1 group and includes the carbon-carbon double bond, then the carbon-carbon double bond is located between a carbon in the $R_5$ group and an adjacent carbon atom to provide the unsaturation and if $R_5$ is a C2 to C10 alkene group and includes the carbon-carbon double bond, then the unsaturation is provided by a carbon-carbon double bond in the alkene group; and/or wherein the reactant having a carbon-carbon double bond less reactive than the carbon-carbon double bond of maleic anhydride is provided by an unsaturated dicarboxylic acid having an absolute value of its carbon-carbon double bound heat of hydrogenation bond less than about 150 KJ/mol; and/or wherein the unsaturated polyester resin includes less than about 10 weight percent, less than about 8 weight percent, less than about 7 weight percent, less than about 6 weight percent, or less than about 5 weight percent, if any, of maleic acid, maleic anhydride, or esterified derivatives thereof, based on the total weight percent of reactants used to form the unsaturated polyester polymer; and/or wherein the unsaturated polyester resin is provided by, based on the total unsaturated reactants, reactants including about 0 to about 25 mol percent of maleic acid, anhydride or ester derivative thereof and about 75 to 100 mol percent of the one or more unsaturated reactants having a carbon-carbon double bond less reactive than the carbon-carbon double bond of maleic anhydride; and/or wherein the unsaturated reactants include one or more of 1-propene-2,3-dicarboxylic acid, methylenesuccinic anhydride, mixtures thereof, mono- or di-alkyl esters thereof, or derivatives thereof, and/or wherein the unsaturated polyester resin is obtained from reactants including at least about 10, at least about 15, or at least about 20 weight percent of unsaturated monomers; and/or wherein the unsaturated polyester resin is obtained from about 20 to about 30 weight percent of reactants providing the unsaturation; and/or wherein the unsaturated polyester resin has an iodine value of at least about 20, at least about 30, or at least about 50; and/or wherein the coating composition includes at least about 50 weight percent, on total resin solids, of the unsaturated polyester resin; and/or wherein the coating composition includes less than about 0.1 weight percent, if any, of an isocyanate or a residue of an isocyanate; and/or wherein the coating composition is substantially free of external cross-linkers; and/or wherein the unsaturated polyester resin self-crosslinks under thermal cure conditions in the absence of external cross-linkers; and/or wherein the coating composition exhibits at least 30 MEK double nubs; and/or wherein the coating composition has volatile organic content of less than about 400 g/kg VOC of solids; and/or further including an organic solvent; and/or wherein the unsaturated polyester resin has an acid value on solids of about 20 to about 40 and a hydroxyl value on solids of about 100 to about 200; and/or wherein the total solids content of the coating composition is about 35 to about 40 weight percent; and/or further comprising a polyalkylene wax; and/or wherein the unsaturated polyester resin has a glass transition temperature of at least 20°, and optimally less than 100° C.; and/or wherein the coating composition includes the metal drier and wherein the metal drier is a metal salt of an organic acid and wherein the metal includes Co, Mn, Pb, Ce, Zr, Ca, Zn, Bi, Cu, Cr, Li, K, Ni, Fe, or Mg or mixtures thereof, and/or wherein the coating composition includes at least about 10 ppm of the metal drier (and optimally less than about 25,000 ppm); and/or wherein the coating composition, when applied to an aluminum substrate and cured for 60 seconds to a peak metal temperature of 193° C. to achieve a dried film thickness of approximately 3.6 gsm, exhibits less than 20 units of abrasion as measured on a comprehensive abrasion test machine; and/or wherein the coating composition, when applied to a flat aluminum panel and cured for 60 seconds to a peak metal temperature of 193° C. to achieve a dried film thickness of approximately 3.6 gsm exhibits a coefficient of friction of less than about 0.07 after a 5 inch/minute test speed using a 2 kg trolley; and/or wherein the coating composition, when applied wet-on-wet at a film weight of 3.6 gsm on an aluminum substrate pre-inked with an ink base coating and cured for about 30 second at about 180 to about 190° C. peak metal temperature requires more than 30 methyl ethyl ketone double-rubs until the substrate is exposed.

In other aspects or embodiments, a food or beverage container having the coating composition of any preceding paragraph over an ink base on an external surface thereof.

In yet other aspects or embodiments, a method of applying an overprint varnish to an external surface of a food or beverage packaging article is provided. In approaches, the method comprises applying a base coating layer to at least a portion of a metal substrate that has formed or is to be formed into the food or beverage packaging article; applying the coating composition on the base coating layer while the base coating layer is still wet to provide an overprint varnish covering at least a portion of the base coating layer; and curing the base coating layer and overprint varnish combination to form a coated metal substrate.

In further embodiments or approaches, the method of the previous paragraph may be combined with optional features and steps in any combination thereof. These optional features or steps include one or more of: wherein the coating composition is applied using one of roll coating, spraying, brushing, spin coating, curtain coating, immersion coating, or combinations thereof; and/or wherein the dry coating thickness of the overprint varnish is about 3 to about 15 g/m²; and/or wherein the curing is about 1 to about 5 minutes at a peak metal temperature of about 150 to about 225° C.; and/or wherein the curing crosslinks the unsaturation of the polyester resin of the coating composition in the absence of external crosslinkers; and/or wherein the base coating layer includes a binder, colorant, and liquid carrier; and/or wherein the base coat and the coating composition are applied to an exterior of an aluminum beverage can; and/or wherein the coating composition is applied by roll coating.

The details of one or more embodiments of the invention are set forth in the description below. Other features, objects, and advantages of the invention will be apparent from the description and from the claims.

Definitions

Unless otherwise specified, the following terms as used herein have the meanings provided below.

The term "aliphatic group" means a saturated or unsaturated linear or branched hydrocarbon group, which can include optional elements other than carbon and hydrogen. This term is used to encompass alkyl, alkenyl, and alkynyl groups, for example. The term "cyclic group" means a closed ring hydrocarbon group that is classified as a cycloaliphatic group or an aromatic group, both of which can include heteroatoms. The term cycloaliphatic group means an organic group that contains a ring that is not an aromatic group. The term "aliphatic" when used in the context of a carbon-carbon double bond includes both linear (or open chain) aliphatic carbon-carbon double bonds and cycloaliphatic carbon-carbon double bonds, but excludes aromatic carbon-carbon double bonds of aromatic rings.

The term "unsaturation" when used in the context of a compound refers to a compound that includes at least one non-aromatic (i.e., aliphatic) carbon-carbon double bond.

Unless otherwise indicated, the term "resin" means an oligomer and/or polymer. An oligomer generally includes a compound with 2 to 10 repeating units, which may be the same or different. A polymer generally includes compounds with 11 or more repeating units and includes both homopolymers and copolymers (i.e., polymers of two or more different monomers). Similarly, unless otherwise indicated, the use of a term designating a resin or polymer class such as, for example, "polyester" is intended to include oligomers, homopolymers, and copolymers (e.g., polyester-urethane polymers).

As used herein, "monomer" or "reactant" generally refers to a compound within a reaction mixture prior to polymerization into oligomers or polymers and monomer units or (alternatively) repeating units or structural units refers to the monomer or reactant within the oligomer and/or polymer. Unless otherwise noted in the specification or apparent from the context of the discussion, the various monomers herein are randomly polymerized monomer units, structural units, or repeating units. If the discussion herein refers to a monomer or reactant, it also implies the resultant monomer unit, structural unit, or repeating unit thereof in the resin or polymer. Likewise, if the discussion refers to a monomer unit, structural unit, or repeating unit, it also implies the monomer or reactant mixture used to form the oligomer or polymer with the associated units therein.

A group that may be the same or different is referred to as being "independently" something. Substitution is anticipated on the organic groups of the compounds of the present disclosure. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like. As used herein, the term "group" is intended to be a recitation of both the particular moiety, as well as a recitation of the broader class of substituted and unsubstituted structures that includes the moiety.

The term "substantially free" when used with respect to a coating composition that may contain a particular compound means that the coating composition contains less than 1,000 parts per million (ppm) of the recited compound (corresponding to less than 0.1 wt. %) regardless of the context of the compound (e.g., whether the compound is mobile in the coating or bound to a constituent of the coating). The term "essentially free" when used with respect to a coating composition that may contain a particular compound means that the coating composition contains less than 100 parts per million (ppm) of the recited compound regardless of the context of the compound. The term "essentially completely free" when used with respect to a coating composition that may contain a particular compound means that the coating composition contains less than 5 parts per million (ppm) of the recited compound regardless of the context of the compound. The term "completely free" when used with respect to a coating composition that may contain a particular compound means that the coating composition contains less than 20 parts per billion (ppb) of the recited compound regardless of the context of the compound. When the phrases "free of" (outside the context of the aforementioned phrases), "do not contain", "does not contain", "does not include any" and the like are used herein, such phrases are not intended to preclude the presence of trace amounts of the pertinent structure or compound which may be present but were not intentionally used, e.g., due to the presence of environmental contaminants. As will be appreciated by persons having ordinary skill in the art, the amount of a compound in an ingredient, polymer, formulation or other component typically may be calculated based on the amounts of starting materials employed and yields obtained when making such ingredient, polymer, formulation or other component.

The term "cross linker" refers to a molecule capable of forming a covalent linkage between polymers or between two different regions of the same polymer. The terms "self-crosslinking" or "self-crosslinkable," when used in the context of a self-crosslinking polymer, refers to the capacity of a polymer to enter into a crosslinking reaction with itself and/or another molecule of the polymer, in the absence of an external cross linker, to form a covalent linkage therebetween. Typically, this crosslinking reaction occurs through reaction of complementary reactive functional groups present on the self-crosslinking polymer itself or two or more separate molecules of the self-crosslinking polymer.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

The term "comprises" and variations thereof do not have a limiting meaning where these terms appear in the description and claims.

The terms "preferred" and "preferably" refer to embodiments herein that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

In one aspect, the disclosure provides an unsaturated resin or a resin having unsaturated functionality effective for self-cross linking in compositions that are at least substantially free of external cross linkers (such as blocked isocyanates and/or formaldehyde-based cross linkers) and still achieve desired performance for internal and/or external food or beverage can coating applications. In some approaches, the unsaturated resin is an unsaturated polyester resin. Thus, in preferred embodiments, the inclusion of an external cross linker is not necessary to achieve the desired balance of coating properties. The unsaturated functionality of the resins herein refers to a group or moiety in the resin that includes one or more carbon-carbon double bonds and where that unsaturation may be in the main chain or pendant to the main chain. Preferably, the unsaturation is an aliphatic unsaturation that is pendant to the main chain. The unsaturated group, in some embodiments, may include two or more carbon-carbon double bonds.

In another aspect, the unsaturated resin or unsaturated polyester resin has an iodine value of at least about 10 and wherein at least some of the unsaturation in the resin is provided by one or more unsaturated reactants having a carbon-carbon double bond less reactive than the carbon-carbon double bond of maleic anhydride. For purposes of this disclosure, such unsaturated reactants having a carbon-carbon double bond less reactive than that of maleic anhydride shall not be considered to include maleic acid or esterified variants of maleic acid or maleic anhydride, in the event the carbon-carbon double bonds of any such compounds are less active than the carbon-carbon double bond of maleic anhydride. While not wishing to be bound by theory in this manner, it is believed that coating compositions herein may include high levels of unsaturated reactants for reactive or thermal-cure cross linking without the undesired problems of gelling and/or high viscosity. Iodine value is a useful measure of the number of aliphatic carbon-carbon double bonds or unsaturation present in the resins herein. The unsaturated resins herein may have any suitable iodine value to achieve a desired result. The iodine values herein are expressed in terms of the centigrams of iodine per gram of the material. Iodine values may be determined as described below in the examples, for example, using ASTM D 5768-02 (Reapproved 2006) entitled "Standard Test Method for Determination of Iodine Values of Tall Oil Fatty Acids" and/or federal specification TT-P-14161 method 506.01. In certain embodiments, the total unsaturated polymer content of the coating composition exhibits an average iodine value pursuant to the aforementioned values or other iodine values disclosed herein.

In yet another aspect, the disclosure relates to a coating composition including the unsaturated resin discussed above and being substantially free of external cross linkers, such as blocked isocyanates and/or formaldehyde-based cross linkers. Examples of formaldehyde-based cross linkers include phenoplast and aminoplast crosslinkers produced using formaldehyde as a reactant such as, for example, phenol-formaldehyde resins, melamine-formaldehyde resins, benzoguanamine-formaldehyde resins, and the like. In some preferred approaches, the coating compositions also includes one of (i) an ether group in the unsaturated polymer or another optional coating composition polymer or ingredient, (ii) a metal drier in the coating composition, or (iii) both the ether group and a metal drier in the coating composition.

In some approaches, the ether group may be present in the unsaturated resin, another optional resin or polymer in the composition, a non-polymer compound in the coating composition, or a combination thereof. In some embodiments, the ether group may be an organic solvent that includes at least one, and in some instances two or more, ether groups. In other approaches, the ether group is provided by one or more reactants having an ether group or moiety capable of participating in a step-growth reaction with other polyester polymer reactants and/or other polymer reactants having the unsaturated functionality.

While not intending to be bound by any theory, it is believed that the presence of ether groups, the metal drier, or combination thereof in some approaches when combined with the selected unsaturated reactants can contribute to the formation of crosslinks upon reactive or thermal cure conditions, which are believed to be formed between aliphatic carbon-carbon double bonds of the unsaturated resin herein (as intra-molecule crosslinks within the same resin chain or crosslinks between separate resin chains), and perhaps to a lesser extent between an aliphatic carbon-carbon double bond and an ether group. The enhanced cure phenomena was observed to occur at elevated thermal cure temperatures such as, for example, those present in a typical coating bake conditions or those of overprint varnish coating cure conditions.

In some approaches, the coating composition may be an overprint varnish suitable for wet-on-wet application to an ink base on an external surface of a food or beverage container. In yet other approaches, it is further contemplated that the coating compositions herein may also have utility in a variety of other coating end uses, including, other packaging coating applications such as, pharmaceutical or medical packaging coating applications; industrial coating applications such as, appliance coatings; coatings for interior or exterior steel building products; HVAC coating applications; coatings for agricultural metal products; wood coatings; and the like applications to suggest but a few suitable applications.

In certain embodiments, at least some of the aliphatic carbon-carbon double bonds of the resins herein are so called "reactive" carbon-carbon double bonds that are sufficiently reactive under suitable thermal cure conditions (such as overprint varnish cure conditions for aluminum beverage cans) to participate in a reaction with one or more other functionalities present in the coating composition to form a covalent linkage when the compositions herein are thermally cured and at least substantially free of external cross linkers. In the resins herein, reactive aliphatic carbon-carbon double bonds provided by the selected reactants are capable of self-reacting under thermal cure conditions described herein with another aliphatic carbon-carbon double bond and/or an ether group to form a covalent linkage. Uniquely, higher total solid compositions can be prepared with the polymers herein with lower volatile organic content (VOC) levels because a pre-cure molecular weight of the resins is lower; as such, the desired molecular weight to achieve performance is formed during the reactive cure of the components during a conventional thermal can coating bake conditions such as, e.g., employed for overprint varnish cure processing and with the compositions being at least substantially free of external cross-linkers as noted herein.

In some approaches, the compositions herein are high solids and low VOC compositions that still have a desirable viscosity measured using a Number 4 Ford cup via ASTM D-1200 preferably between about 40 and about 60 seconds at 25° C. that allows conventional application techniques to be utilized. More specifics of the polymers and compositions are provided below.

Unsaturated Resin: In one aspect of the compositions herein, the coating compositions include an unsaturated resin and, preferably, an unsaturated polyester resin capable of self-crosslinking. The unsaturated resin (such as the unsaturated polyester resin), in one approach, has a level of unsaturation as reflected by an iodine value of at least about 10, at least about 20, at least about 30, or at least about 50. An upper range of suitable iodine values is not particularly limited, but in most embodiments the iodine value typically will not exceed about 120 or about 100. Thus, the resins and polyester resins herein preferably have an iodine value ranging from at least about 10, at least about 20, at least about 30, at least about 40, or at least about 50 to about 120 or less, about 110 or less, about 100 or less, about 90 or less, about 80 or less, or about 70 or less. Iodine value is measured as described above and in the Examples.

The unsaturation in the resin is obtained from one or more reactants or monomers having a carbon-carbon double bond that is less reactive than the carbon-carbon double of maleic anhydride. In some embodiments, a majority of unsaturation in the resin is obtained from the reactants having a carbon-carbon double bond less reactive than that of maleic anhydride. Heat of hydrogenation may be one useful indicator of the reactivity of an aliphatic carbon-carbon double bond. In some embodiments, the unsaturated resin includes (or is formed by reactants having) one or more aliphatic carbon-carbon double bonds having a heat of hydrogenation less than that of maleic anhydride. As used herein, when a heat of hydrogenation is stated to be, for example, "less than X" or the like, it should be understood that reference is made to the absolute value of the heat of hydrogenation because heats of hydrogenation are typically reported as negative values, with a larger negative value indicating a higher heat of hydrogenation (e.g., −40 kcal/mole is a higher heat of hydrogenation than −10 kcal/mole). In some approaches, the unsaturated resins herein are obtained from unsaturated reactants or monomers having an absolute value of its heat of hydrogenation less than 150 KJ/mol. In some approaches, the unsaturated resins herein are obtained from unsaturated reactants or monomers having an absolute value of its heat of hydrogenation less than that of maleic anhydride.

In some approaches, the unsaturated reactant or monomer suitable for forming the unsaturated resins herein include unsaturated carboxylic acids or unsaturated polycarboxylic acids having in some embodiments, the called for reactivity and/or heats of hydrogenation of its double bonds as noted above. In other embodiments, the one or more unsaturated reactants have the below structure of Formula I which is intended to include all stereoisomers:

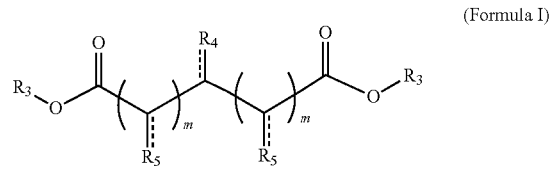

(Formula I)

wherein each $R_3$ is independently hydrogen or an aliphatic group (preferably each $R_3$ is hydrogen), $R_4$ is a C1 group or a C2 to C10 alkene group (preferably $R_4$ is a C1 group), at least one of $R_4$ or $R_5$ includes at least one carbon-carbon double bond (which can be located at any position, including between the first carbon atom of the pendant group and the attached backbone carbon atom), and each m is independently an integer from 0 to 4. In some approaches, $R_3$ may include an ether group. Preferably, one m is an integer of 1 and the other m is an integer of 0 or 1. Each $R_5$ is independently hydrogen or a saturated or unsaturated organic group (preferably hydrogen).

If $R_4$ in Formula I above is a C1 group and includes unsaturation, then a carbon-carbon double bond is preferably located between a carbon in the $R_4$ group and an adjacent carbon atom in the main chain to provide pendant or side-chain unsaturation. In this approach, the $R_4$ group is a $=CH_2$ group. Alternatively, if $R_4$ is a longer carbon chain having a C2 to C10 alkene group and including unsaturation, then the unsaturation may be provided by one or more carbon-carbon double bonds in the $R_4$ alkene group. $R_5$ may have similar composition as $R_4$ discussed above. Any carbon atom in Formula I above may be substituted by hydrogen or another moiety as needed to satisfy the valency of carbon.

In yet other approaches, the unsaturated reactants or monomers forming the resins herein may include one or more carboxylic acids, anhydrides, or esters thereof having the called for double bond reactivity and, in some approaches, may be selected from 1-propene-2,3-dicarboxylic acid, methylenesuccinic anhydride, mixtures thereof, mono- or di-alkyl esters thereof, dimethyl itaconate, dibutyl itaconate, ethyl itaconate, or derivatives thereof, or any mixtures thereof.

In some approaches, the unsaturated reactant or monomer (as well as the resultant resin) includes pendant unsaturation or pendant carbon-carbon double bonds. In yet other embodiments, the pendant carbon-carbon double bonds or pendant unsaturation is positioned adjacent to a carbonyl carbon where one of the carbons in the carbon-carbon double bound also is covalently bonded to a carbonyl carbon. When polymerized in the resins herein, the associated unsaturation is retained in the resultant resin structure, which is preferably pendant unsaturation from the main chain or polyester resin backbone.

In some preferred approaches, pendant unsaturation is present in the unsaturated resin is in the form of one or more carbon-carbon double bonds positioned between a backbone carbon atom of the resin and a first, and in some embodiments only, carbon atom of the unsaturated pendant group.

The unsaturation in the resins or polyester resins herein may also be derived from other unsaturated reactants, but amounts of such other unsaturated reactants are typically limited because high levels of the other unsaturated reactants may result in gelled mixtures and/or compositions with a viscosity unsuitable for packaging coating applications. For instance and in some approaches, the compositions herein have a viscosity measured using a Number 4 Ford cup via ASTM D-1200 at 25° C. between about 40 and about 60 seconds. For example, the other unsaturated reactants may include, in limited amounts, other unsaturated polycarboxylic acids or mixtures of unsaturated polycarboxylic acids that may include monomers, oligomers, polymers, or a mixtures of various polycarboxylic acids having a carbon-carbon double bond reactivity equal to or greater than the carbon-carbon double bond of anhydride. Non-limiting examples of suitable polycarboxylic acids include saturated or unsaturated dicarboxylic acids and polycarboxylic acids having higher acid functionality (e.g., tricarboxylic acids, tetracarboxylic acids, etc.) or anhydrides thereof, precursors or derivatives thereof (e.g., an esterifiable derivative of a polycarboxylic acid, such as a dimethyl ester or anhydride), or mixtures thereof. Suitable saturated or unsaturated polycarboxylic acids may include, for example, maleic acid, fumaric acid, succinic acid, adipic acid, phthalic acid, tetrahydro phthalic acid, methyltetrahydrophthalic acid, hexahydrophthalic acid, methylhexahydrophthalic acid, endomethylenetetrahydrophthalic acid, azelaic acid, sebacic acid, isophthalic acid, trimellitic acid, terephthalic acid, naphthalene dicarboxylic acid, cyclohexane dicarboxylic acid, glutaric acid, dimer fatty acids, anhydrides or derivatives thereof (e.g., alkyl esters thereof), and mixtures thereof. If desired, adducts of polyacid compounds (e.g., triacids, tetraacids, etc.) and monofunctional compounds may be used. An example of one such adduct is pyromellitic anhydride pre-reacted with benzyl alcohol. It should be understood that in synthesizing the resins, the specified acids may be in the form of anhydrides, esters (e.g., alkyl ester) or like equivalent form. Another example is trimellitic anhydride condensed with ethanol amine to form a hydroxy acid imide compound. For sake of brevity, such other unsaturated compounds discussed in this paragraph with a carbon-carbon double bond as reactive as or more reactive than that of maleic anhydride, are referred to herein as "other carboxylic acids" or "other unsaturated reactants."

To achieve the desired coating performance, the unsaturated polyester resin is obtained, based on the total amount of reactants, from reactants including at least about 10 weight percent, at least about 15 weight percent, or at least about 20 weight percent of unsaturated reactants or monomers. In other approaches, the unsaturated polyester resin is obtained from reactants including less than about 30, less than about 25, less than about 20 weight percent of the unsaturated reactants or monomers. In yet other approaches, the reactants forming the unsaturated polyester resin may include the so-called other unsaturated reactants as described above (e.g., maleic acid, maleic anhydride, alkyl esters thereof, and mixtures thereof) in amounts, if any, of 10 weight percent or less, 8 weight percent or less, 6 weight percent or less, 4 weight percent or less, or 2 weight percent or less based on the total weight of reactants used to form the unsaturated polyester resin. Preferably, the polyester resin may be derived from limited amounts, if any, of maleic acid, anhydride, or an ester thereof in amounts of about 6 weight percent or less.

Depending on the application and when used in the thermal cure conditions for food and beverage can coating applications, too much maleic acid, anhydride, or ester derivative thereof (or such other unsaturated reactants) tend to gel or form the unacceptably high viscosity due to the reactivity of the carbon-carbon double bond in such reactant. Thus, in some approaches, the unsaturated polyester resin is provided by, based on the total unsaturated reactants, reactants including about 0 to about 25 mol percent of maleic acid, maleic anhydride, or an ester derivative thereof (or other unsaturated reactant) and about 75 to about 100 mol percent of the one or more unsaturated reactants having a carbon-carbon double bond less reactive than the carbon-carbon double bond of maleic anhydride. In yet other approaches, the unsaturated polyester resin is prepared, based on the total unsaturated reactants used, from at least about 0, at least about 5, at least about 10, at least about 15, or at least about 20 mol percent to less than about 25, less than about 15, less than about 10 or less than about 5 mol percent of maleic acid, anhydride, or an ester derivative thereof (or such other unsaturated reactant). At the same time, the unsaturated polyester resin is also prepared from, based on the total unsaturated reactants used, at least about 25, at least about 30, at least about 35, at least about 40, at least about 45, at least about 50, at least about 60, or at least about 70 to less than 75, less than 60, less than 50, less than 40, or less than 30 mol percent of the unsaturated reactants having a carbon-carbon double bond less reactive than maleic anhydride.

The unsaturated resins or unsaturated polyester resins herein may include a backbone of any suitable structural configuration. The backbone may have different structural configurations depending on a variety of factors such as the materials used to form the backbone, cost, and the desired end use for the resin. For example, the backbone may be linear or branched. A backbone that includes one or more heteroatoms (e.g., oxygen, nitrogen, silicon or sulfur) may be suitable in some end uses. Examples of suitable backbones include polyamide, polycarbonate, polyester, polyimide, polyether, polyurethane, polyurea, or copolymers thereof. The backbone may further include any other suitable segments, if desired. In one embodiment, the backbone does not include any urethane linkages.

In some approaches, a polyester backbone is particularly preferred to achieve suitable coating performance. For purposes of convenience, the unsaturated resin throughout has been generally described as a polyester resin, although it should be understood that the teachings of the present disclosure are broadly applicable to a wide variety of other resin types, including step-growth resins other than polyester resins. If desired, the polyester backbone may optionally, or alternatively, include one or more other backbone step-growth linkages (e.g., condensation linkages) such as, for example, amide, ester, carbonate ester, ether, imide, imine, urea, or urethane linkages, or a combination thereof. In one embodiment, the unsaturated polyester resin does not include any step-growth linkages other than ester linkages. In another embodiment, the polyester resin does not include any urethane linkages. In some embodiments, the unsaturated polyester resin is a linear resin or a substantially linear, resin. In other embodiments, the unsaturated resin may include branching and/or pendant unsaturation. The unsaturated resin may have any suitable end groups and/or side groups.

The unsaturated resin or unsaturated polyester resin, prior to cure, may be of any suitable molecular weight, and may vary depending upon a variety of considerations, including, for example, the backbone chemistry of the resin, whether the resin is a water-dispersible oligomer or polymer or a solution oligomer or polymer, cost, and the desired coating properties. Typically, the unsaturated resins herein will have a pre-cure (e.g., prior to any cure of the liquid coating composition including the resin) number average molecular weight of at least 300, at least 400, more preferably at least 500, at least 550, or at least 800, and even more preferably at least 1,000. The unsaturated resin will typically exhibit a pre-cure number average molecular weight of no greater than 3,000; no greater than 2,000; no greater than 1,500; no greater than 1,000; no greater than 800; or no greater than 600. In some embodiments, the unsaturated polyester resin exhibits a number average molecular weight of about 400 to about 1,500 and, in other approaches, about 550 to about 1,500. Upon suitable thermal coating cure conditions, the unsaturated polyester resin herein, even when substantially free of external cross-linkers, self-crosslink to build post-cure molecular weight above a Mn of 4,000 or above a Mn of 10,000.

The unsaturated resins may be formed using any suitable reactants and any suitable process in addition to those described above. In embodiments where the resin has a polyester backbone, the overall polyester resin and/or polyester backbone segments can be formed, for example, by reacting: unsaturated reactants (e.g., the above-specified unsaturated reactants) and optionally one or more polyols, one or more polyacids (e.g., a dicarboxylic acid compound) or polyacid equivalents (e.g., an anhydride, ester or like equivalent form), and one or more optional monomer, oligomer, and/or polymer ingredients via a condensation or other suitable reaction to form a polyester. In one embodiment, an unsaturated polyester resin is formed by reacting ingredients including the above-described unsaturated polycarboxylic acid(s), other saturated or unsaturated polycarboxylic acids(s) as described above, polyol(s), and/or optionally hydroxyl-terminated polyester oligomer, polymer, or monomer to achieve the desired polyester backbone.

Any suitable polyol or mixture of polyols may be used to form the unsaturated polyester resins herein. The one or more polyols may be a monomer, an oligomer, a polymer, or a mixture thereof. In addition, the one or more polyols can be a diol, a triol, a polyol having four or more hydroxyl groups, or a mixture thereof. Diols are presently preferred. Non-limiting examples of suitable oligomer and/or polymer polyols include polyether polyols, polyester polyols, polyether-ester polyols, polyurethane polyols, polyurea polyols, polyamide polyols, polyimide polyols, polycarbonate polyols, saturated or unsaturated polyolefin polyols, and combinations thereof. Suitable polyol monomers may include, for example, glycols and/or glycerol.

Non-limiting examples of suitable polyols may include, for example, ethylene glycol, propylene glycol, 1,3-propanediol, 2-methyl-1,3-propanedoil, glycerol, diethylene glycol, dipropylene glycol, triethylene glycol, trimethylolpropane, trimethylolethane, tripropylene glycol, neopentyl glycol, pentaerythritol, 1,4-butanediol, hexylene glycol, cyclohexanedimethanol, a polyethylene or polypropylene glycol, 2,4,4-tetramethyl-1,3-cyclobutanediol, and mixtures thereof. If desired, adducts of polyol compounds (e.g., triols, tetraols, etc.) and monofunctional compounds may be used.

Suitable unsaturated polyester resins may be prepared using standard condensation reactions. The polyester resin is typically derived from a mixture of at least one polyfunctional alcohol esterified with at least one polycarboxylic acid as described herein. In some embodiments, a transesterification polymerization or other process may be used. If desired, the polyester resin may include polymer linkages (e.g., amide, carbamate, carbonate ester, ether, urea, urethane, etc.), side chains, and end groups not related to simple polyol and polyacid components.

Aliphatic carbon-carbon double bonds may be incorporated in the unsaturated resin of the present invention using any suitable process. For example, one or more reactants including one or more aliphatic carbon-carbon double bonds as discussed above can be included in the reactants used to form the resin. Alternatively, the unsaturated resin may be optionally post-modified to include some, or all, of the aliphatic carbon-carbon double bonds. In some embodiments, the aliphatic carbon-carbon double bonds are incorporated into the resin via a step-growth reaction involving unsaturated monomers, oligomers, and/or polymers having one or more active hydrogen groups (e.g., such as those described herein). An unsaturated polyol is another example of one such reactant. An example of an unsaturated polyol is a hydroxyl-terminated polybutadiene (e.g., those sold under the KRASOL tradename from Cray Valley). In some embodiments, an addition reaction may be used to incorporate aliphatic carbon-carbon double bonds into the unsaturated resin. For example, an unsaturated compound such as a polybutadiene compound may be incorporated into the unsaturated polymer itself, or another reactant used to form the resin (e.g. an unsaturated reactant having one or more active hydrogen groups), via an addition reaction such as a free-radical polymerization.

In some approaches, the backbone segment of pendant structural unit including the unsaturated group may be connected to at least one other portion of the resin via a step-growth linkage (e.g., a condensation linkage) such as, for example, an amide, carbamate, carbonate ester (—O—C(=O)—O—), ester, ether, urea, or urethane linkage group. A covalent linkage formed from, for example, an addition polymerization reaction (e.g., a free-radical-initiated addition polymerization such as a vinyl polymerization) is not considered a step-growth linkage. Ester linkages are presently preferred step-growth linkages. If desired, other organic linkage groups such as, for example, substituted or unsubstituted hydrocarbyl linking groups may also be used.

As noted above, the polyester resin may include optional segments other than polyester segments. Typically, however, at least about 50 weight percent of the polyester will comprise polyester segments. In other embodiments, substantially all (such as about 80 weight percent or more, about 90 weight percent or more, or about 95 weight percent or more), or all, of the polyester includes polyester segments.

The polyester resin herein may have any suitable hydroxyl number. Hydroxyl numbers are typically expressed as milligrams of potassium hydroxide (KOH) equivalent to the hydroxyl content of 1 gram of the hydroxyl-containing substance. Methods for determining hydroxyl numbers are well known in the art. See, for example, ASTM D1957-86 (Reapproved 2001) entitled "Standard Test Method for Hydroxyl Value of Fatty Oils and Acids" and available from the American Society for Testing and Materials International of West Conshohocken, Pennsylvania. In certain preferred embodiments, the polyester resin has a hydroxyl number of from 100 to about 200, even more preferably from about 130 to about 190, and optimally from about 150 to about 190.

The polyester resin may have any suitable acid number. Acid numbers are typically expressed as milligrams of KOH required to titrate a 1-gram sample to a specified end point.

Methods for determining acid numbers are well known in the art. See, for example, ASTM D974-04 entitled "Standard Test Method for Acid and Base Number by Color-Indicator Titration" and available from the American Society for Testing and Materials International of West Conshohocken, Pennsylvania. The range of suitable acid numbers may vary depending on a variety of considerations including, for example, whether water-dispersibility is desired. In some embodiments, the polyester resin has an acid number of at least about 20, more preferably at least about 25, and even more preferably at least about 30. Depending on the desired monomer selection, in certain embodiments (e.g., where a solvent-based coating composition is desired), the polyester resin has an acid number of about 40 or less, about 30 or less, or about 25 or less.

In some embodiments, the unsaturated resin or polyester may include one or more optional urethane linkages, and, if included, more preferably a plurality of urethane linkages. Thus, for example, in some such embodiments, the resin may be an unsaturated polyester-urethane resin. Urethane linkages are typically formed by reacting ingredients that include one or more hydroxyl-functional compounds and one or more isocyanate-functional compounds. If desired, a polyester-urethane resin may be formed, for example, through reaction of a polyester polyol and a diisocyanate or other polyisocyanate compound. In other approaches, the polyester resin may be bio-sourced and/or derived from reactants that are natural or bio-sourced.

Ether Group: As previously discussed, the resins and/or compositions herein may also include an ether group. The ether group may include any suitable coating ingredient that includes one or more ether groups, including any of the resins as discussed herein. In some embodiments, the ether group is preferably present in the unsaturated resin or polyester resin itself. In such embodiments, the unsaturated resin or polyester preferably includes an efficacious amount of ether groups. The ether group may also be present in one or more other optional polymers that may be present in the coating composition such as, for example, a filler polymer.

A useful measure of the amount of ether groups or ether linkages present in a polymer herein is the total mass of ether oxygen relative to the total mass of the unsaturated resin. As used herein the term "ether oxygen" refers to the oxygen atom present in an ether linkage. Thus, for example, the total mass of ether oxygen present in a polymer does not include the mass of any non-ether oxygen atoms that may be present, for example, in a polyether segment. In some embodiments, the unsaturated resin or polyester herein includes at least about 1 weight percent of ether oxygen, more preferably at least 2.0 weight percent of ether oxygen, and even more preferably at least about 4 weight percent of ether oxygen. The upper range of ether linkages present in the unsaturated resin is not particularly limited, but the resin or polyester will typically include less that about 8 weight percent or less than about 7 weight percent of ether oxygen. The coating composition may include a second polymer that includes a suitable amount of ether linkages such as, for example, an amount pursuant to that described above for the unsaturated resins of this disclosure.

Any suitable compound or reactant may be used to incorporate ether groups into the unsaturated resin herein or any other optional polymer of the coating composition. Functionalized ether or polyether compounds can be used such as, for example, an ether-containing ethylene glycol (e.g., diethylene glycol, triethylene glycol, tetraethylene glycol, etc.); an ether-containing propylene glycol (e.g., dipropylene glycol, tripropylene glycol, tetrapropylene glycol, etc.); an ether-containing butylene glycol (e.g., dibutylene glycol, tributylene glycol, tetrabutylene glycol, etc.); a polyethylene glycol; a polypropylene glycol; polybutylene glycol; or a copolymer or mixture thereof. In some embodiments, a functionalized ether- or polyether-containing compound is attached to one or more other portions of the unsaturated binder resin via one or more step-growth linkages (e.g., ester linkages). In certain embodiments, a structural unit derived from an ether- or polyether-containing compound is located in a backbone of the unsaturated binder resin and is attached on at least one end, and in some instances both ends, to another portion of the resin backbone via a step-growth linkage (e.g., an ester linkage).

In some approaches, the unsaturated resins or polyester resins herein includes the ether group, and wherein the ether group of the unsaturated polyester is provided by one or more reactants having an ether group. The reactant having the ether group, for example, may have the structure of Formula II below

$R_1$—$(CR_2)_n$—O—$(CR_2)_n$—$R_1$ (Formula II)

wherein $R_1$ is independently a reactive group capable of participating in a step-growth reaction and $R_2$ is independently a hydrogen, a halogen (not preferred), or an organic group, and n is independently an integer preferably from 1 to 10. In some approaches, $R_1$ is independently a carboxylic group, an anhydride group, an alkyl ester group, or a hydroxyl group. In other approaches, each $R_1$ is a hydroxyl group and each n independently an integer from 1 to 4. In preferred approaches, the ether group is provided by diethylene glycol.

It is contemplated that the benefits of ether groups may also be realized, at least in part, by incorporating an efficacious amount of ether linkages into one or more non-polymer components of the coating composition such as, for example, a low-molecular weight compound (such as, about 1,000 Daltons or less, more typically about 500 Daltons or less) having one or more ether groups. Suitable low-molecular weight compounds may include ether-containing monomers, ether-containing oligomers, and/or volatile organic compounds including one or more ether groups (e.g., reactive diluents, organic solvents, etc.). In some embodiments, the low-molecular-weight, ether-containing compound preferably includes two or more ether groups. Examples of suitable low-molecular-weight, ether-containing compounds include glycol ethers such as, e.g., diethylene glycol, dipropylene glycol, tripropylene glycol, polyethylene glycols, polypropylene glycols, polybutylene glycols; alkyl ethers of, e.g., ethylene glycol, propylene glycol, butanediol, hexanediol, diethylene glycol, and dipropylene glycol; alkyl esters of alkyl ether glycols (e.g., alkyl esters of any of the aforementioned alkyl ether glycols); and cyclic ether-containing compounds (which can have more than one oxygen atoms in the ring and optionally additional heteroatoms such as nitrogen) such as, e.g., oxetanes, tetrahydrofuran, and six-member or higher cyclic ethers; and mixtures thereof. Further examples of suitable such compounds may include any of the other non-polymer, ether-containing compounds disclosed herein.

Metal Drier: Coating compositions herein may optionally include one or more metal drier catalysts to, for example, enhance cure of the coating composition. As mentioned above, the metal drier may be included together with the ether group or used in the composition without the ether group. If included, the one or more metal driers are preferably included in an efficacious amount. While not intending to be bound by any theory, it is believed that the presence of an efficacious amount of one or more metal driers may enhance crosslinking upon coating cure (e.g., by enhancing and/or inducing the formation of crosslinks between aliphatic carbon-carbon double bonds of the unsaturated resin). Non-limiting examples of suitable metal driers may include compounds with aluminum (Al), antimony (Sb), barium (Ba), bismuth (Bi), calcium (Ca), cerium (Ce), chromium (Cr), cobalt (Co), copper (Cu), iridium (Ir), iron (Fe), lead (Pb), lanthanum (La), lithium (Li), manganese (Mn), Neodymium (Nd), nickel (Ni), rhodium (Rh), ruthenium (Ru), palladium (Pd), potassium (K), osmium (Os), platinum (Pt), sodium (Na), strontium (Sr), tin (Sn), titanium (Ti), vanadium (V), Yttrium (Y), zinc (Zn), zirconium (Zr), any other suitable rare earth metal or transition metal, as well as oxides, salts (e.g., acid salts such as octoates, naphthenates, stearates, neodecanoates, etc.) or complexes of any of these, and mixtures thereof.

In some approaches, the amount of metal drier used will depend, at least partially, upon the particular drier(s) chosen for a particular end use. In general, however, the amount of metal drier present in the coating composition, if any, may suitably be greater than about 10 parts per million ("ppm") by weight, preferably greater than about 25 ppm by weight, and more preferably greater than about 100 ppm by weight, based on the total weight of metal in the metal drier relative to the total weight of the coating composition. The amount of metal drier may suitably be less than about 25,000 ppm by weight, in other approaches, less than about 15,000 ppm by weight, and in yet further approaches, less than about 10,000 ppm by weight, based on the total weight of metal in the metal drier relative to the total weight of the coating composition.

In some approaches, the metal drier(s) may include metal salts of organic acids effective in catalyzing polymerization of the unsaturated polyester used in the coating composition. In such form, the metal driers may be metal salts of cycloalkanic acids such as naphthenic acid, alkanic acids such as neodecanoic acids, and C8 to C20 fatty acids. Metal driers, in some embodiments, in an organic hydrocarbon solvent are preferred for use in the coating composition. Suitable commercially available metal driers include, for example, those available from Tenneco, Inc., Piscataway, N.J. under the trade designation Syn Nuxtra Co 12, Syn Nuxtra Mg 12, and Syn Nuxtra K 15 or Borchi from Borchers, GmbH. For purposes of this disclosure, a metal drier is not considered an external cross-linker.

Coating Composition: The coating compositions herein may include any suitable amount of the unsaturated resin, such as the unsaturated polyester resin described herein, to produce the desired result. In preferred embodiments, the coating composition includes from about 50 to about 100 weight percent of the unsaturated resin or polyester resin, more preferably at least about 60 weight percent, and even more preferably at least about 70 weight percent, based on the total nonvolatile weight of the coating composition. Preferably, the coating compositions include less than about 99 weight percent, more preferably less than about 95 weight percent, and even more preferably less than about 80 weight percent of unsaturated polymer or polyester, based on the total nonvolatile weight of the coating composition.

The total amount of solids (or total nonvolatile components) present in coating compositions herein may vary depending upon a variety of factors including, for example, the desired method of application. Presently preferred coating compositions include at least about 30 weight percent, more preferably at least about 35 weight percent, and even more preferably at least about 40 weight percent of solids, based on the total weight of the coating composition. In certain preferred embodiments, the coating composition includes less than about 80 weight percent, more preferably less than about 70 weight percent, and even more preferably less than about 65 weight percent of solids, less than about 50 weight percent, or less than about 40 weight percent, based on the total weight of the coating composition. The solids of the coating composition may be outside the above ranges for certain types of applications. For example, for inside spray applications of the coatings compositions, the weight percent solids may be as low as about 20 weight percent. Preferably, the compositions have a total solids content ranging from about 30 to about 40 weight percent, and in other approaches, about 35 to about 40 weight percent. Even with such high solids content, the compositions herein also have the low volatile organic content as noted further below.

The coating compositions herein, in some approaches, are also substantially free of formaldehyde or a residue thereof, if any are even present, whether present as a structural unit of a coating ingredient (e.g., an external cross linker) or present as free formaldehyde in the coating composition. In other approaches, the coating composition has less than 100 ppm of formaldehyde and any residues of formaldehyde, less than about 50 ppm, less than about 10 ppm, or none. Those of ordinary skill appreciate that a test is not necessarily needed to determine the presence or lack of formaldehyde or any residue thereof in the coating compositions herein. That is, one of skill can readily determine the presence or lack of any formaldehyde in view of the various reactants used to form the resins and other components of the coating compositions herein.

The coating compositions herein are also, in some approaches, substantially free of isocyanate compounds and residues thereof, if any are even present, whether present as a structural unit of the unsaturated polyester, other resin, or provided as free isocyanate in the coating composition. In approaches, the coating composition has less than 100 ppm of isocyanate and any residues of isocyanate, less than about 50 ppm, less than about 10 ppm, or none. Again, those of ordinary skill appreciate that a test is not necessarily needed to determine the lack of isocyanates and any residues thereof. That is, one of skill can readily determine the presence or lack of any isocyanate in view of the various reactants used to form the resin and other components of the coating compositions herein.

The unsaturated resins and/or coating compositions herein are also preferably substantially free, more preferably essentially free, even more preferably essentially completely free, and optimally completely free of each of bisphenol A (BPA) and residues thereof (e.g., the diglycidyl ether of BPA (BADGE)), bisphenol S (BPA) and residues thereof (e.g., the diglycidyl ether of BPS), and bisphenol F (BPF) and residues thereof (e.g., the diglycidyl ether of BPF (BFDGE)). In some embodiments, the resins and/or coating compositions are substantially free, essentially free, essentially completely free, or completely free of each of aromatic glycidyl ether compounds and epoxy novalacs.

In some embodiments, the unsaturated resin and/or coating composition is at least substantially "epoxy-free," more preferably "epoxy-free." The term "epoxy-free," when used herein in the context of a resin, refers to a resin that does not include any "epoxy backbone segments" (i.e., segments formed from reaction of an epoxy group and a group reactive with an epoxy group). Thus, for example, a polymer made from ingredients including an epoxy resin would not be considered epoxy-free. Similarly, a polymer having backbone segments that are the reaction product of a bisphenol (e.g., bisphenol A, bisphenol F, bisphenol S, 4,4'dihydroxy bisphenol, etc.) and a halohdyrin (e.g., epichlorohydrin) would not be considered epoxy-free.

In some embodiments, the unsaturated resin is "PVC-free," and preferably the coating composition is also "PVC-free." That is, each composition preferably contains less than about 2 weight percent of vinyl chloride materials, more preferably less than about 0.5 weight percent of vinyl chloride materials, and even more preferably less than about 1 ppm of vinyl chloride materials. In preferred embodiments no halogen-containing ingredients are intentionally used in preparing either the unsaturated resin or the coating composition, although trace amounts may be present due to, e.g., environmental conditions.

As noted above, the coating compositions herein are preferably free of formaldehyde-based crosslinkers, and in some embodiments free of external cross linkers whether formaldehyde-based or not. That is, for the coating compositions herein that employ a self-crosslinking embodiment of the unsaturated resin or unsaturated polyester resin, it may not be necessary or desirable to include a separate curing agent such as a separate or external cross linker. As already discussed, certain embodiments of the present invention, when suitably cured, yield a suitably crosslinked coating composition in the absence of any external crosslinking agents (e.g., phenoplasts, blocked isocyanates, aminoplasts, bets-hydroxy alkyl amide crosslinkers, etc.) In other words, in preferred embodiments, the coating compositions herein are substantially free, essentially free, essentially completely free, completely free, or even free of each of the following: phenolic cross linkers (e.g., phenoplasts), amino cross linkers (e.g., aminoplasts), blocked isocyanate cross linkers, and epoxy-functional cross linkers.

In some embodiments, the coating composition can be formulated to include one or more non-formaldehyde-based cross linkers. Examples of such cross linkers include carboxyl-reactive crosslinkers such as alkanolamide-type curing agents, and beta hydroxy alkyl amide crosslinkers in particular (e.g., those sold by EMS-CHEMIE AG under the tradename PRIMID and particularly the PRIMID XL-552 and QM-1260 products). Similarly, while not preferred, in some embodiments the coating composition can optionally include one or more formaldehyde-based cross linkers.

The coating compositions herein preferably have a low volatile organic compound (VOC) content. Typical volatile organic compounds have relatively high vapor pressures at ordinary, room-temperature conditions. Their high vapor pressures generally results from a low boiling point at 1 atm of pressure, typically below 100° C., often below 80° C. and even below 50° C. The relatively low boiling point which causes large numbers of molecules to evaporate or sublimate from the liquid or solid form of the compound and enter the surrounding air. VOCs can be solids, liquids, or gases at room temperature. Many have a vapor pressure at 25° C. equal to or greater than 0.1 mmHg. VOC content refers to the weight of VOC per unit volume or per unit weight of a composition. VOC content can be expressed as weight of VOC materials including solvent(s) if any per unit volume of solids, i.e., non-solvent constituents, of the composition. An exemplary VOC content is expressed as kg VOC per liter solids. A suitable test method for VOC may be found in ASTM D2369 or equivalent.

Preferred coating compositions and/or manufacturing compositions herein have a VOC content of no greater than 0.2 kg VOC/liter solids, and more preferably no greater than 0.3 kg VOC/liter solids. Such VOCs are even obtained with a target solids content of about 30 to about 40 weight percent. In other approaches the VOC achievable with the resins herein have about 300 g/kg dried to about 400 g/kg dried VOC. Dried VOC is calculated as follows VOC (g/kg dried)=1000×(100−solid ASTM−% H$_2$O) divided by solid ASTM. Where solid ASTM is 1 gram at 1 hour at 110° C.

In some embodiments, any of the coating compositions herein, when applied to an aluminum substrate or formed aluminum beverage can substrate (or when applied wet-on-wet over a ink coating on such substrates) and cured for 60 seconds to a peak metal temperature of 193° C. to achieve a dried film thickness of approximately 3.6 gsm and, if needed, formed into a standard beverage can (e.g. through any needed necking and/or flanging), exhibits less than 20 units of abrasion as measured on a comprehensive abrasion test machine (such as, Gavarti Associates GV-CAT systems, TQC sheer machines, or equivalent). Such tests involve reciprocating motion to replicate field transportation abrasion damage of coatings or mimic abrasive forces on exterior surfaces during high-speed can manufacturing, high-speed can filling as well as other contact abrasion during processing, shipping, storage, and the like. In other approaches or embodiments, the coating compositions herein, when applied to a flat aluminum (or applied wet-on-wet as an overprint varnish) panel and cured for 60 seconds to a peak metal temperature of 193° C. to achieve a dried film thickness of approximately 3.6 gsm may also exhibit a coefficient of friction of less than about 0.07 after a 5 inch/minute test speed using a 2 kg trolley. In yet further embodiments, the coating composition, when applied wet-on-wet at a film weight of 3.6 gsm on an aluminum substrate pre-inked with an ink base coating and cured for about 30 second at about 180 to about 190° C. peak metal temperature requires more than 30 methyl ethyl ketone double-rubs until the substrate is exposed.

Other additives: If desired, the coating compositions herein may optionally include other additives that do not adversely affect the coating composition or a cured coating resulting therefrom. Suitable additives include, for example, those that improve the processability or manufacturability of the composition, enhance composition aesthetics, or improve a particular functional property or characteristic of the coating composition or the cured composition resulting therefrom, such as adhesion to a substrate. Additives that may be included are carriers, additional polymers, emulsifiers, pigments, metal powders or paste, fillers, anti-migration aids, anti-microbials, extenders, curing agents, lubricants (e.g., polyalkylene waxes, PTFE waxes, and the like such as polyethylene wax), coalescents, wetting agents, biocides, plasticizers, crosslinking agents, antifoaming agents, colorants, waxes, anti-oxidants, anticorrosion agents, flow control agents, thixotropic agents, dispersants, adhesion promoters, UV stabilizers, scavenger agents or combinations thereof. Each optional ingredient can be included in a sufficient amount to serve its intended purpose, but preferably not in such an amount to adversely affect a coating composition or a cured coating resulting therefrom.

The coating composition may optionally include a wax. The optional wax may be included to provide lubricity to the coating composition and/or abrasion resistance to the finished coated substrate. Typical optional waxes usable include natural and synthetic waxes such as Carnauba Wax, Petrolatum Wax, Polyethylene Wax, Polymeric Wax, Lanocerin Wax, and the like.

The coating compositions herein may also include a liquid carrier, which is preferable in most embodiments. Any suitable carrier may be used to prepare coating compositions herein. Suitable carriers include carrier liquids such as organic solvents, water, or mixtures thereof. Preferably, the liquid carrier(s) are selected to provide a dispersion or solution of the polymers herein. Suitable organic solvents include aliphatic hydrocarbons (e.g., mineral spirits, kerosene, high flashpoint VM&P naphtha, and the like); aromatic hydrocarbons (e.g., benzene, toluene, xylene, solvent naphtha 100, 150, 200 and the like); alcohols (e.g., ethanol, n-propanol, isopropanol, n-butanol, iso-butanol and the like); ketones (e.g., acetone, 2-butanone, cyclohexanone, methyl aryl ketones, ethyl aryl ketones, methyl isoamyl ketones, and the like); esters (e.g., ethyl acetate, butyl acetate and the like); glycols (e.g., butyl glycol); glycol ethers (e.g., ethylene glycol monomethyl ether, ethylene glycol monoethyl ether, ethylene glycol monobutyl ether, propylene glycol monomethyl ether, methoxypropanol and the like); glycol esters (e.g., butyl glycol acetate, methoxypropyl acetate and the like); and mixtures thereof.

If present, the amount of liquid carrier included in the coating composition will vary, for example, depending upon the application method and the desired amount of solids. Preferred embodiments of the coating compositions herein include at least about 20 weight percent of liquid carrier, more typically at least about 30 weight percent of the liquid carrier or even about 35 weight percent of the liquid carrier. In such embodiments, the coating composition will typically include less than 70 weight percent of the liquid carrier, more typically less about 75 weight percent of liquid carrier, in some approaches, less about 60 weight percent of liquid carrier, less about 50 weight percent of liquid carrier, less about 40 weight percent of liquid carrier, or less about 35 weight percent of liquid carrier. In some embodiments, the coating composition is a solvent-based coating composition that preferably includes no more than a de minimus amount (e.g., 0 to 2 weight percent) of water. In other embodiments, the coating composition can include a substantial amount of water.

In preferred embodiments, the coating compositions herein are water-based varnish or water-based overprint varnish, more preferably low VOC such coating compositions. In preferred such embodiments, preferably at least about 50 weight percent of the liquid carrier system is water, more preferably at least about 60 weight percent is water, and more preferably at least about 75 weight percent is water. And even more preferably 80 or even 85 weight percent water. Certain coating compositions herein include at least about 10 weight percent of water, more preferably at least about 20 weight percent of water, and even more preferably at least about 40 weight percent of water (in some embodiments about 50 weight percent or more of water), based on the total weight of the coating composition.

If desired, the resins of the present disclosure can be made water dispersible using conventional techniques. For instance, the use of amine or acid functionality produces water dispersibility. In some approaches, at least a portion of the carboxylic acid groups and/or anhydride groups in the resin may be neutralized or partially neutralized with a suitable basic compound to produce water-dispersing groups. The basic compound used for neutralization may be preferably a fugitive base, more preferably an amine fugitive base (e.g., primary, secondary, and/or tertiary amines), with tertiary amines being particularly preferred. Some examples of suitable tertiary amines are trimethyl amine, dimethylethanolamine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, N dimethyl 1-hydroxy-2-propyl amine, triethyl amine, tributyl amine, N-methyl morpholine, and mixtures thereof. Triethyl amine and dimethyl ethanol amine are preferred tertiary amines.

Coating compositions herein may be prepared by conventional methods in various ways. For example, the coating compositions may be prepared by simply admixing the unsaturated resin or polyester resin, optional additional polymers, and any other optional ingredients, in any desired order, with sufficient agitation. The resulting mixture may be admixed until all the composition ingredients are substantially homogeneously blended. Alternatively, the coating compositions may be prepared as a liquid solution or dispersion by admixing an optional carrier liquid, the unsaturated resin or polyester resin, and any other optional ingredients, in any desired order, with sufficient agitation. An additional amount of carrier liquid may be added to the coating compositions to adjust the amount of nonvolatile material in the coating composition to a desired level.

Cured coatings herein preferably adhere well to metal (e.g., steel, tin-free steel (TFS), tin plate, electrolytic tin plate (ETP), aluminum, etc.) as well as to previously applied coatings or ink and provide high levels of resistance to corrosion, degradation, or abrasion. The coatings may be applied to any suitable surface, including inside surfaces of containers, outside surfaces of containers, container ends, and combinations thereof. The coating composition herein can be applied to a substrate using any suitable procedure such as spray coating, roll coating, coil coating, curtain coating, immersion coating, meniscus coating, kiss coating, blade coating, knife coating, dip coating, slot coating, slide coating, and the like, as well as other types of premetered coating. In one embodiment where the coating is used to coat metal sheets or coils, the coating can be applied by roll coating. The coating composition can be applied on a substrate prior to, or after, forming the substrate into an article (such as a beverage can). In some embodiments, at least a portion of a planar substrate is coated with one or more layers of the coating composition, which is then cured before the substrate is formed into an article (e.g., via stamping, drawing, or draw-redraw).

In some approaches, the coating compositions herein are suitable for exterior surfaces of packaging articles (e.g., exterior sidewall surfaces of aluminum beverage cans), and may be applied onto a substrate that has been primed or coated with a base coat or an ink layer. Base coats may be clear or pigmented as desired. The coating compositions herein may also be applied onto a substrate having one or more layers of ink, decorative coating or paint. Typically, the coating compositions may be applied to a coating having multiple layers of ink such as in a multi-station printing process (e.g., 4-color press). Preferred coating compositions herein may be applied onto a "wet" layer (that is wet-on-wet application) or, alternatively, onto a dried substrate (e.g., a cured layer). Roll coating, spraying, or brush coating may efficiently include application of the coating compositions herein onto a wet substrate (e.g., a substrate that has an applied layer of an unbaked ink or decorative image). In preferred embodiments, the coating compositions herein provide abrasion resistance to the coated substrate. A substrate with excellent abrasion resistance is preferred to meet the demands of uses, such as in food and beverage cans, aerosol cans, shaving cream cans, paint cans, and the like to suggest a few examples. For example, the abrasive forces an exterior can coating must endure during high-speed can manufacture, high-speed can filling and processing, shipping, storage, use etc. can be substantial.

After applying the coating composition onto a substrate, the composition can be cured using a variety of processes, including, for example, oven baking by either conventional or convectional methods. The curing process may be performed in either discrete or combined steps. For example, the coated substrate can be dried at ambient temperature to leave the coating composition in a largely un-crosslinked state. The coated substrate can then be heated to fully cure the coating composition. In certain instances, the coating composition can be dried and cured in one step. In preferred embodiments, the coating composition of the invention is a heat-curable coating composition.

The curing process may be performed at any suitable temperature, including, for example, oven temperatures in the range of about 100° C. to about 300° C. to achieve a desired peak metal temperature. For example, if metal coil is the substrate to be coated, curing of the applied coating composition may be conducted, for example, by subjecting the coated metal to an elevated peak metal temperature of about 200° C. to about 250° C. for a suitable time period (e.g., about 15 to 30 seconds). If metal sheeting is the substrate to be coated (e.g., as used to make three-piece food cans), curing of the applied coating composition may be conducted, for example, by subjecting the coated metal to an peak metal temperature environment of about 180° C. to about 250° C. for a suitable time period (e.g. about 20 to about 40 seconds) for a tack-free coating. This cure may be followed with a post cure at 100 to 250° C. for up to 10 or 12 minutes.

Coating compositions of the invention may be useful in a variety of coating applications. As previously discussed, the coating compositions are particularly useful as adherent coatings on interior or exterior surfaces of metal packaging containers and especially exterior surfaces (e.g., exterior sidewall surfaces of metal cans, and especially those of two-piece D&I aluminum beverage cans). Non-limiting examples of such articles include closures (including, e.g., internal surfaces of twist-off caps for food and beverage containers); internal crowns; two and three-piece cans (including, e.g., food and beverage containers); shallow drawn cans; deep drawn cans (including, e.g., multi-stage draw and redraw food cans); can ends (including, e.g., easy open can ends); monobloc aerosol containers; and general industrial containers, cans, and can ends.

Preferably, the cured coatings are retortable when employed in food and beverage container applications. Preferred cured coatings of the invention are capable of withstanding elevated temperature conditions frequently associated with retort processes or other food or beverage preservation or sterilization processes. Particularly preferred cured coatings exhibit enhanced resistance to such conditions while in contact with food or beverage products that exhibit one or more aggressive (or corrosive) chemical properties under such conditions. Some examples of such aggressive food or beverage products may include meat-based products, milk-based products, fruit-based products, energy drinks, and acidic or acidified products. The coating composition of the invention could be used as a coating on an interior surface of the sidewall of a three-piece food can. The coating composition is typically applied to a metal sheet which is then typically cured prior to fabricating the coated sheet into the sidewall of a three-piece food can.

In one particular application, the coating compositions herein can be used to form protective coating films on a wide range of metal containing substrates. The coating compositions are particularly well suited as exterior coatings on food and beverage packaging articles such as, for example, overprint varnishes. Specifically, the coating compositions can be applied directly or indirectly onto all or a portion of the metal surfaces of a substrate. In some modes of practice, optionally one or more other kinds of coatings or packaging features may be interposed between the coating compositions and the substrate. For example, printed or other visually observable features may be formed on the substrate and then the coating composition is applied onto the features. The coating composition may be applied onto such features after the features are cured. In other modes of practice, the coating composition may be applied using "wet on wet" techniques where the features might still be at least partially wet when the coating composition is applied. In such instances, it is believed that functionality of the coating composition may penetrate through the ink layer(s) to bond via chemical and/or physical adhesion directly to underlying metal surface(s). As noted above, coatings applied over printed features are referred to in the industry as overprint varnishes. The coatings of the present invention provide durable, abrasion resistant, water resistant and tough overprint varnishes. Waterborne embodiments have very low VOC content and are environmentally friendly. Optionally, one or more other kinds of coatings may be applied over the resultant coatings to achieve a variety of performance objectives. For example, stain resistant coatings, oxygen or other barriers, additional printing or labels, ultraviolet protection layers, security indicia, authentication indicia, and/or combinations of these may be used if desired.

After coating, the coating composition is allowed or caused to cure to form a protective film. Heating coated articles can facilitate more rapid curing. Other kinds of curing energy also can be used if desired, depending upon the kind of crosslinking functionality incorporated into the constituents of the coating compositions. The coating composition can be applied one or more times to build up film thickness in stages. In typical embodiments, resultant final coatings of the present disclosure have a total average thickness in the range from about 3 g/m$^2$ to about 15 g/m$^2$ for illustrative varnish embodiments and about 8 g/m$^2$ to about 12 g/m$^2$ for pigmented coatings.

In one exemplary application method, a wash coating method may be used to apply the compositions herein to the exterior of two-piece drawn and ironed ("D&I") cans with a thin layer of protectant coating. The exterior of these D&I cans are 'wash-coated' by passing pre-formed two-piece D&I cans under a curtain of coating. The cans are inverted, that is the open end of the can is in the 'down' position when passing through the curtain. This curtain of coating takes on a 'waterfall-like' appearance. Once these cans pass under this curtain of coating, the liquid coating material effectively coats the exterior of each can. Excess coating is removed through the use of an 'air knife.' Once the desired amount of coating is applied to the exterior of each can, each can is passed through a thermal and/or ultraviolet and/or electromagnetic curing oven to dry and cure the coating. The residence time of the coated can within the confines of the curing oven is about 1 to about 5 minutes. The curing temperature within this oven will range between about 150 to about 220° C.

A coil coating method is another type of coating application suitable for the compositions herein. This coating method may be suitable for application to a metal (e.g., steel or aluminum). Once coated, the coating coil is subjected to a short thermal, and/or ultraviolet and/or electromagnetic curing cycle, which lead to the drying and curing of the coating. Coil coatings provide coated metal (e.g., steel and/or aluminum) substrates that can be fabricated into formed articles such as 2-piece drawn food cans, 3-piece food cans, food can ends, drawn and ironed cans, beverage can ends and the like.

A sheet coating is yet another suitable application method that is commonly used for separate pieces of a variety of materials (e.g., steel or aluminum) that have been pre-cut into square or rectangular 'sheets'. Typical dimensions of these sheets are approximately one square meters. Once coated, each sheet is cured. Once dried and cured, the sheets of the coated substrate are collected and prepared for subsequent fabrication. Coil coatings provide coated metal (e.g., steel or aluminum) substrate that can be successfully fabricated into formed articles such as 2-piece drawn food cans, 3-piece food cans, food can ends, drawn and ironed cans, beverage can ends and the like.

Lastly, a side seam coating may also be used and is typically a spray application of a liquid coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically requires a layer of liquid coating, which protects the exposed 'weld' from subsequent corrosion or other effects to the contained foodstuff. The liquid or powder coatings that function in this role are termed 'side seam stripes'. Typical side seam stripes are spray applied and cured quickly via residual heat from the welding operation in addition to a small thermal and/or ultraviolet and/or electromagnetic oven.

Test Methods

Unless indicated otherwise, the following test methods were utilized in the Examples that follow.

Solvent Resistance Test: The extent of "cure" or crosslinking of a coating is measured as a resistance to solvents, such as methyl ethyl ketone (MEK). This test is performed as described in ASTM D5402-93. The number of double-rubs (i.e., one back-and-forth motion) is reported. Preferably, the MEK solvent resistance is at least 15 double rubs after 30 second cure at 177° C. peak metal temperature (PMT), at least 30 double rubs after 30 seconds cure at 182° C. PMT, or at least 50 double rubs at 30 second cure at 193° C. PMT. The coatings may also achieve such double rub performance after 60 seconds cure at 193° C. PMT Adhesion Test: Adhesion testing was performed to assess whether the coating compositions adhere to the coated substrate. The Adhesion Test was performed according to ASTM D3359-Test Method B, using SCOTCH 610 tape, available from 3M Company of Saint Paul, Minnesota Adhesion is generally rated on a scale of 0-10 where a rating of "10" indicates no adhesion failure, a rating of "9" indicates 90% of the coating remains adhered, a rating of "8" indicates 80% of the coating remains adhered, and so on. A coating is considered herein to satisfy the Adhesion Test if it exhibits an adhesion rating of at least 8.

Blush Resistance Test: Blush resistance measures the ability of a coating to resist attack by various solutions. Typically, blush is measured by the amount of water absorbed into a coated film. When the film absorbs water, it generally becomes cloudy or looks white. Blush was measured visually using a scale of 0-5 where a rating of "0" indicates no blush, and a rating of "5" indicates severe whitening of the film.

Water Pasteurization (also referred to as Water Retort): Water retort is a measure of the coating integrity of the coated substrate after exposure to heat and pressure with a liquid such as water. Water retort performance is not necessarily required for all food and beverage coatings, but is desirable for some product types that are packed under retort conditions. Testing is accomplished by subjecting the substrate to heat ranging from 105-130° C. and pressure of 15 psi (~1.05 kg/cm$^2$) for a period of 15 to 90 minutes. The coated substrate was then tested for adhesion and blush as described above.

Iodine Value: Prepare Starch Solution by dissolving 5 grams of soluble starch with 100 milliliters (ml) of deionized (D.I.) water. Add 400 ml of boiling D.I. water, stir until clear, and allow to cool. This solution will not keep for more than a few days and should be made fresh as needed. Prepare Potassium Iodide Solution by dissolving 150 grams of Potassium Iodide in 1,000 ml of D.I. water. A small portion of the sample under test shall be weighed by difference into an Erlenmeyer iodine flask, the amount of sample taken being such that from 10 to 30% of an iodine solution (such as, e.g., Wijs Iodine Monochloride Solution—Fisher Scientific Co. Cat. No. SI106-4 or equivalent) will be absorbed. Pipette 20 ml of chloroform into each sample flask. Stopper the flasks, add a Teflon stirring bar and stir until the samples dissolve. Prepare two flasks for blanks by pipetting 20 ml of chloroform into separate flasks. Pipette into each flask (2 flasks for each sample and 2 flasks for blanks) 25 ml of the iodine solution. Stopper the flasks, stir for 30 seconds, then let stand with occasional swirling for 30 minutes in a dark place at room temperature. At the end of the standing time, pipette 20 ml. of Potassium Iodide Solution and 80 ml of D.I. water, stopper and stir. Add 2 ml of the Starch Solution and immediately titrate with 0.1N sodium thiosulfate (Fisher Scientific Cat. No. SS368-1). Calculate the iodine value as the difference in the average volume (in milliliters) of 0.1N sodium thiosulfate required for the blank less the average volume (in milliliters) required for the sample, multiplied by 1.269 and divided by the sample weight in grams. The iodine value is calculated using the following equation: [(Average volume blank−Average volume sample)×1.269]/[Sample Weight in grams]. The iodine value is reported as the centigrams of iodine absorbed per 1 gram of the material.

Coefficient of Friction (COF): Coefficient of friction is measured with an Alteck (or comparable Mobility or Lubricity Tester) using a metal ball moving on the surface of the coating with a pressure of about 2 kg weight. The force required to move the metal ball on the coating is measured and its coefficient of friction is calculated with this force. Coatings of the present disclosure typically having coefficient of friction between about 0.04 and 0.06.

Process or Retort Resistance: This is a measure of the coating integrity of the coated substrate after exposure to heat and pressure with a liquid such as water. Retort performance is not necessarily required for all food and beverage coatings, but is desirable for some product types that are packed under retort conditions. The procedure is similar to the Sterilization or Pasteurization Test. Testing is accomplished by subjecting the substrate to heat ranging from 105-130° C. and pressure ranging from 0.7 kg/cm$^2$ to 1.05 kg/cm$^2$ for a period of 15 minutes to 90 minutes. For this test, a coated substrate is immersed in deionized water and subjected to heat of 121° C. (250° F.) and pressure of 1.05 kg/cm$^2$ for a period of 90 minutes. The coated substrate was then tested for adhesion and blush as described above. In food or beverage applications requiring retort performance, adhesion ratings of 10 and blush ratings of at least 7 are typically desired for commercially viable coatings.

Sterilization or Pasteurization: The sterilization or pasteurization test determines how a coating withstands the processing conditions for different types of food products packaged in a container. Typically, a coated substrate is immersed in a water bath and heated for 5 minutes to 60 minutes at temperatures ranging from 65° C. to 100° C. For the present evaluations, the coated substrate was immersed in a deionized water bath for 15 to 30 minutes at 82° C. The coated substrate was then removed from the water bath and tested for coating adhesion and blush as described below. Commercially viable coatings preferably provide adequate pasteurization resistance with perfect adhesion (rating of 10) and blush ratings of at least 5, optimally at least 9.

EXAMPLES

The resins and coating compositions herein are illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Missouri.

Example 1

An inventive unsaturated polyester resin was prepared by charging the components of Table 1 below to a separate vessel equipped with a stirrer, packed column, decanter, thermocouple and a heating mantle. The process was a follows: first add the diethyleneglycol, 1,4-cyclohexane dimethanol, itaconic acid, 4-methoxyphenol, and titanium catalyst (Tyzor TE, available from DuPont) to the reactor. Heat to 220° C. progressively and extract distillate (water) through the packed column filled with rings. Temperature at the top of the packed column is typically about 99 to about 101° C. Pursue distillation until acid value is between about 20 and 30. Next, cool the resin down to about 170° C., and set up the equipment for azeotropic distillation. Load Xylene in the kettle in order to have NVC about 94%. Heat the reactor until reaching stable distillation. Maintain distillation until acid value is less than 3. Cool resin down to 170° C. Next, load trimellitic anhydride in the reactor, and heat progressively to 180° C. Hold at 180° C. until acid value is about 33 to about 35. Cool resin down to 150° C. for dilution with butylglycol to have NVC of about 90%. Cool resin down to 50° C. Load dimethylethanolamine (50% in water) in the reactor in 10 min and hold about 30 min at 50° C. Then load the remaining water in the reactor.

TABLE 1

Unsaturated Polyester Resin

| Ingredient | %, weight |
|---|---|
| Diethyleneglycol | 21.7 |
| 1,4-Cyclohexanedimethanol | 21.7 |
| Itaconic acid | 27.1 |
| Trimellitic anhydride | 6.36 |
| 4-Methoxyphenol | 0.04 |
| Catalyst | 0.06 |
| Xylene | 4.0 |
| Butylglycol | 3.6 |
| Dimethylethanolamine(100%) | 3.3 |
| Water | 12.0 |

The formed unsaturated polyester resin had an acid value on solids of about 32 to 34, a noury viscosity at 25° C. of about 28 to 34 P, a calculated hydroxyl value on solids of about 190, a calculated iodine valve of 69 on solids or 53 on liquids, and a calculated molecular weight of about 560 g/mol. The resin of Example 1 did not include any formaldehyde-based structural units, or any formaldehyde residue in the resultant polyester polymer.

Example 2

The unsaturated resin of Example 1 was blended with the components of Table 2 below to form an overprint varnish composition. The coating was cured for 60 seconds at 193° C. PMT and had a film weight of 3.6 gsm. The evaluation of the overprint varnish are provided in Table 3 as compared to a typical formaldehyde containing overprint varnish (Valspar water-based external over varnish 28Q07AD).

TABLE 2

| Ingredient | Amount, % weight |
|---|---|
| Water | 35.0 |
| Nonionic Wax Emulsion (Prohere L90901) | 1.0 |
| Dimethylethanolamine | 0.3 |
| Example 1 Resin | 52.5 |
| FE Metal Drier (Borchi 1101) | 2.2 |
| Polyethylene wax (Lanco 1530) | 0.2 |
| PTFE wax | 0.8 |
| Butyl Glycol Ether | 6.5 |
| Polyether-modified polymethylalkylsiloxane (Byk 325) | 0.5 |
| Aqueous solution of a high molecular weight acrylic polymer flow agent (Synaqua) | 1.0 |

TABLE 3

Composition and Cured Coating Performance Evaluation

| Performance | Control | Example 2 |
|---|---|---|
| Viscosity Ford 4 @25° C. | 50 sec | 60 sec |
| Solids Content | 39.5% | 40% |
| pH | 8.2 | 8 |
| Alteck COF | 0.049 | 0.051 |
| Reactivity 30 s@193° C. PMT | 100 DR | 70 DR |
| Reactivity 30 s@182° C. PMT | 100 DR | 50 DR |
| Reactivity 30 s@177° C. PMT | 100 DR | 18 DR |
| Reactivity after IBO | >100 DR | >100 DR |
| Pasteurization: Joy 1% 15 min@ 82° C. | GT0-No blush | GT0-No blush |
| Pasteurization: Stella 0.063% 15 min@ 82° C. | GT0-No blush | GT0-No blush |
| Pasteurization: Carlsberg 0.3% 15 min@ 82° C. | GT0-No blush | GT0-No blush |
| DI-Water pasteurization | GT0-No blush | GT0-No blush |
| Cure Degradation: IBO2 | >100 DR | >100 DR |
| Cure Degradation: IBO3 | >100 DR | >100 DR |
| Cure Degradation: IBO4 | >100 DR | >100 DR |
| Cure Degradation: IBO5 | >100 DR | >100 DR |

*IBO refers to repeated cure passes through an inside bake oven.

It is noted that, as used in this specification and the appended claims, the singular forms "a," "an," and "the," include plural referents unless expressly and unequivocally limited to one referent. Thus, for example, reference to "an antioxidant" includes two or more different antioxidants. As used herein, the term "include" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

It is to be understood that each component, compound, substituent or parameter disclosed herein is to be interpreted as being disclosed for use alone or in combination with one or more of each and every other component, compound, substituent or parameter disclosed herein.

It is further understood that each range disclosed herein is to be interpreted as a disclosure of each specific value within the disclosed range that has the same number of significant digits. Thus, for example, a range from 1 to 4 is to be interpreted as an express disclosure of the values 1, 2, 3 and 4 as well as any range of such values.

It is further understood that each lower limit of each range disclosed herein is to be interpreted as disclosed in combination with each upper limit of each range and each specific value within each range disclosed herein for the same component, compounds, substituent or parameter. Thus, this disclosure to be interpreted as a disclosure of all ranges derived by combining each lower limit of each range with each upper limit of each range or with each specific value within each range, or by combining each upper limit of each range with each specific value within each range. That is, it is also further understood that any range between the endpoint values within the broad range is also discussed herein. Thus, a range from 1 to 4 also means a range from 1 to 3, 1 to 2, 2 to 4, 2 to 3, and so forth.

Furthermore, specific amounts/values of a component, compound, substituent or parameter disclosed in the description or an example is to be interpreted as a disclosure of either a lower or an upper limit of a range and thus can be combined with any other lower or upper limit of a range or specific amount/value for the same component, compound, substituent or parameter disclosed elsewhere in the application to form a range for that component, compound, substituent or parameter.

The foregoing detailed description and examples have been given for clarity of understanding only. No unnecessary limitations are to be understood therefrom. The disclosure herein is not limited to the exact details shown and described, for variations obvious to one skilled in the art will be included within the invention defined by the claims.

What is claimed is:

1. A method of applying an overprint varnish to an external surface of a food or beverage packaging article, the method comprising:
   applying a base coating layer to at least a portion of a metal substrate that has formed or is to be formed into the food or beverage packaging article;
   applying a coating composition on the base coating layer while the base coating layer is still wet to provide an overprint varnish covering at least a portion of the base coating layer;
   the coating composition includes an unsaturated polyester resin having an iodine value at least about 10, wherein at least some of the unsaturation of the polyester resin is provided by one or more unsaturated reactants having a carbon-carbon double bond less reactive than a carbon-carbon double bond of maleic anhydride; wherein the coating composition is substantially free of formaldehyde-based cross linkers; and wherein the coating composition includes one of (i) an ether group in the unsaturated polyester resin, (ii) a metal drier in the coating composition, or (iii) both an ether group in the unsaturated polyester resin and a metal drier in the coating composition;
   curing the base coating layer and overprint varnish combination to form a coated metal substrate; and
   wherein the dry coating weight of the overprint varnish is about 3 to about 15 g/m².

2. The method of claim 1, wherein the coating composition is substantially free of formaldehyde and residues thereof whether present as a structural unit of a component of the coating or free formaldehyde in the coating composition.

3. The method of claim 1, wherein the unsaturated polyester resin includes pendant aliphatic unsaturation.

4. The method of claim 1, wherein the unsaturated polyester resin includes the ether group.

5. The method of claim 1, wherein a reactant having the ether group for use in preparing the unsaturated polyester resin has the structure $R_1—(CR_2)_n—O—(CR_2)_n—R_1$ wherein each $R_1$ is independently a reactive group capable of participating in a step-growth reaction and each $R_2$ is independently a hydrogen or an organic group, and n is independently an integer from 1 to 10.

6. The method of claim 1, wherein the one or more unsaturated reactants have the structure of Formula I

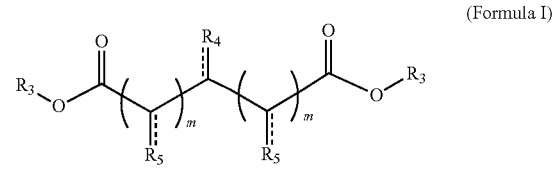

(Formula I)

wherein
   $R_3$ is independently hydrogen or a hydrocarbyl group;
   $R_4$ is a C1 group or a C2 to C10 alkene group;
   m is independently an integer from 0 to 4;
   $R_5$ is independently hydrogen or a saturated or unsaturated group;
   at least one of $R_4$ or $R_5$ includes a carbon-carbon double bond; and
   if $R_4$ is the C1 group and includes the carbon-carbon double bond, then the carbon-carbon double bond is located between a carbon in the $R_4$ group and an adjacent carbon atom to provide the unsaturation and if $R_4$ is the C2 to C10 alkene group and includes the carbon-carbon double bond, then the unsaturation is provided by a carbon-carbon double bond in the alkene group; and
   if $R_5$ is a C1 group and includes the carbon-carbon double bond, then the carbon-carbon double bond is located between a carbon in the $R_5$ group and an adjacent carbon atom to provide the unsaturation and if $R_5$ is a C2 to C10 alkene group and includes the carbon-carbon double bond, then the unsaturation is provided by a carbon-carbon double bond in the alkene group.

7. The method of claim 1, wherein the reactant having a carbon-carbon double bond less reactive than the carbon-carbon double bond of maleic anhydride is provided by an unsaturated dicarboxylic acid having an absolute value of its carbon-carbon double bond heat of hydrogenation less than about 150 KJ/mol.

8. The method of claim 1, wherein the unsaturated polyester resin is provided by, based on the total unsaturated reactants, reactants including about 0 to about 25 mol percent of maleic acid, anhydride or ester derivative thereof and about 75 to 100 mol percent of the one or more unsaturated reactants having a carbon-carbon double bond less reactive than the carbon-carbon double bond of maleic anhydride.

9. The method of claim 1, wherein the unsaturated reactants include one or more of 1-propene-2,3-dicarboxylic acid, methylenesuccinic anhydride, mixtures thereof, mono- or di-alkyl esters thereof, or derivatives thereof.

10. The method of claim 1, wherein the unsaturated polyester resin is obtained from reactants including at least about 10 weight percent of unsaturated monomers.

11. The method of claim 1, wherein the unsaturated polyester resin is obtained from about 20 to about 30 weight percent of reactants providing the unsaturation.

12. The method of claim 1, wherein the unsaturated polyester resin has an iodine value of at least about 20.

13. The method of claim 1, wherein the coating composition is substantially free of external cross-linkers.

14. The method of claim 13, wherein the unsaturated polyester resin self-crosslinks under thermal cure conditions in the absence of external cross-linkers.

15. The method of claim 1, wherein the coating composition has volatile organic content of less than about 400 g/kg VOC of solids.

16. The method of claim 1, wherein the coating composition further comprises a polyalkylene wax.

17. The method of claim 1, wherein the unsaturated polyester resin has a glass transition temperature of at least 20° C.

18. The method of claim 1, wherein the coating composition includes the metal drier and wherein the metal drier is a metal salt of an organic acid and wherein the metal includes Co, Mn, Pb, Ce, Zr, Ca, Zn, Bi, Cu, Cr, Li, K, Ni, Fe, or Mg or mixtures thereof and wherein the coating composition includes at least about 10 ppm of the metal drier.

* * * * *